(12) United States Patent
Azenkot et al.

(10) Patent No.: US 9,154,345 B1
(45) Date of Patent: Oct. 6, 2015

(54) DEVICE AND METHOD FOR REDUCING MODULATION PROFILE MEMORY SIZE

(71) Applicant: Marvell International Ltd., Hamilton HM (BM)

(72) Inventors: Yehuda Azenkot, San Jose, CA (US); Zvi Bernstein, San Jose, CA (US); Wee Peng Goh, Temecula, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/280,532

(22) Filed: May 16, 2014

Related U.S. Application Data

(63) Continuation of application No. 13/218,403, filed on Aug. 25, 2011, now Pat. No. 8,731,080.

(60) Provisional application No. 61/377,091, filed on Aug. 26, 2010.

(51) Int. Cl.
*H04L 27/28* (2006.01)
*H04L 27/00* (2006.01)
*H04B 3/02* (2006.01)

(52) U.S. Cl.
CPC .............. *H04L 27/0012* (2013.01); *H04B 3/02* (2013.01)

(58) Field of Classification Search
CPC .... H04L 27/26; H04L 27/2601; H04L 1/0003
USPC .......................................... 375/260
See application file for complete search history.

(56) References Cited

U.S. PATENT DOCUMENTS 8,594,208 B2 * 11/2013 Choi et al. ................... 375/260

\* cited by examiner

*Primary Examiner* — Kevin Kim

(57) ABSTRACT

A machine implemented method includes determining a signal modulation for each of a plurality of profiles; generating a first indicator indicating a signal modulation determined for a first profile in the plurality of profiles; generating a second indicator indicating a relationship between the signal modulation for the first profile and the signal modulation for each of the other profiles; notifying at least one node of the first and second indicators.

17 Claims, 8 Drawing Sheets

DEVICE AND METHOD FOR REDUCING MODULATION PROFILE MEMORY SIZE

PRIORITY REFERENCE TO PRIOR APPLICATION

This application is a continuation of U.S. patent application Ser. No. 13/218,403, filed on Aug. 25, 2011, now U.S. Pat. No. 8,731,080, and also claims benefit of and incorporates by reference U.S. patent application Ser. No. 61/377,091, filed on Aug. 26, 2010.

TECHNICAL FIELD

This invention relates generally to receivers and more particularly, but not exclusively, provides a method and apparatus for Modulation Profile Memory Size Reduction in a Multimedia Over Coax Alliance (MoCA) system.

BACKGROUND

The MoCA 2.0 standard defines Modulation Profiles that have a set of parameters that determines the transmission between nodes, including preamble type, cyclic prefix length, modulations per subcarrier and transmit power. Each MoCA 2.0 Node maintains two PHY profiles for each 100 MHz unicast link: one for Nominal Packet Error Rate of 1e-6 (NPER) and one for Very Low Packet Error Rate of 1e-8 (VLPER). Similarly, two PHY profiles are maintained for 100 MHz Greatest Common Density (GCD) or Broadcast profiles: one for NPER (1e-6) and one for VLPER (1e-8). The GCD is a modulation format computed by a node for transmission to multiple recipient nodes. For the GCD or Broadcast format, the modulation used for each subcarrier is chosen to be the greatest possible modulation density that is less than or equal to the modulation density for that subcarrier as reported in the most recent Error Vector Magnitude (EVM) Probe Report the node sent to each of the other nodes. The EVM probe is used to determine the optimum modulation scheme for a set of subcarriers. During a new Node admission procedure, PHY profiles for both NPER and VLPER are distributed. Since the VLPER packets are more robust to errors than the NPER packets, the modulations per subcarrier of the VLPER profile are usually equal or lower than the corresponding modulations per subcarrier of the NPER profile.

However, the above-mentioned modulation schemes require a large amount of memory for each subcarrier. More specifically, 1,920 bits per modulation profile. Assuming 15 nodes, the total memory required for storing NPER and VLPER modulation profiles is 57,600 bits.

Accordingly, an apparatus and method to reduce modulation profile memory size may be desirable.

SUMMARY

In an embodiment, a machine implemented method comprises determining a signal modulation for each of a plurality of profiles; generating a first indicator indicating a signal modulation determined for a first profile in the plurality of profiles; generating a second indicator indicating a relationship between the signal modulation for the first profile and the signal modulation for each of the other profiles; notifying at least one node of the first and second indicators.

In an embodiment, A computer-readable medium configured to store instructions which enable a controller to perform a method, the method comprises determining a signal modulation for each of a plurality of profiles; generating a first indicator indicating a signal modulation determined for a first profile in the plurality of profiles; generating a second indicator indicating a relationship between the signal modulation for the first profile and the signal modulation for each of the other profiles; notifying the first and second indicators in the network.

In an embodiment, a method for modulating or demodulating a signal comprises obtaining a signal modulation for a plurality of profiles, comprising: for a first profile, obtaining a signal modulation for the first profile indicated by a first indicator; for any of the other profiles, obtaining a signal modulation indicated by a combination of the first indicator and at least a part of a second indicator; modulating/demodulating the signal with the obtained signal modulations.

In an embodiment, a device comprises a controller configured to perform a method comprising: determining a signal modulation for each of a plurality of profiles; generating a first indicator indicating a signal modulation at the subcarrier determined for a first profile in the plurality of profiles; generating a second indicator indicating a relationship between the first profile and each of the other profiles; a transmitter configured to notify at least one other device of the first and second indicators.

In an embodiment, a device comprises a controller, configured to obtain, for a transmission source unit, a signal modulation for a plurality of profiles, wherein the obtaining comprises: for a first profile, obtaining a signal modulation for the first profile indicated by a first indicator; for any of the other profiles, obtaining a signal modulation indicated by a combination of the first and at least a part of a second indicator; a modulator/demodulator communicatively coupled to the controller, configured to modulate/demodulate a signal with the obtained signal modulations.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
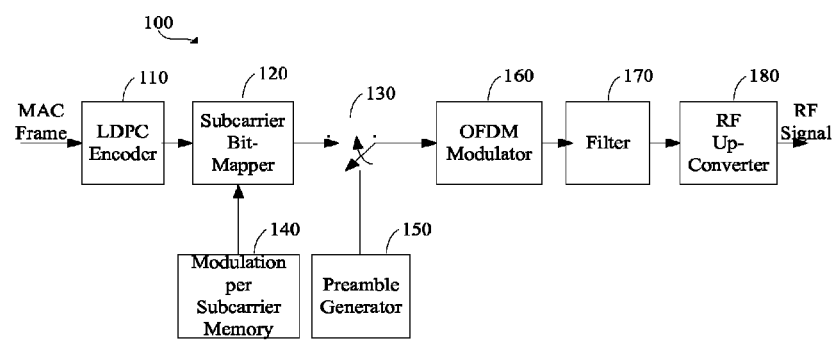
FIG. 1 is a block diagram illustrating a transmitter according to an embodiment of the invention.

FIG. 1 is a block diagram illustrating a transmitter 100 according to an embodiment of the invention. The transmitter 100 comprises a Low-Density Parity Check (LDPC) error correction encoder 110 coupled to a subcarrier bit-mapper 120, which receives input from a modulation per Subcarrier memory 140. An appender 130 receives input from the bit-mapper 120 and a preamble generator 150. Output of the appender 130 goes to an Orthogonal Frequency Division Multiplexing (OFDM) modulator 160, which outputs to a Filter 170 and then an RF Up-Converter 180.

During operation of the transmitter 100, an input Media Access Control (MAC) frame is first encoded via the Low-Density Parity Check (LDPC) error correction encoder 110. Then, a resulting serial bit stream is assigned to subcarriers according to the modulation profile given in the modulation per subcarrier memory 140 and finally mapping the bits assigned to each subcarrier to the appropriate Quadrature Amplitude Modulation (QAM) by the mapper 120. The preamble sequence generated by the preamble generator 150 is appended to the beginning of each packet by the appender 130. The stream of complex numbers input by the appender 130 to the OFDM modulator 160 are converted to time domain samples by computing an Inverse Fast Fourier Transform (IFFT) on a block of 512 complex numbers. Cyclic prefix samples are inserted at the beginning of each OFDM symbol. The cyclic prefix samples are generated from the last Number of Cyclic Prefix ($N_{CP}$) samples of the IFFT output which are copied and prepended to form one OFDM symbol. Then, the stream of samples is filtered by the filter 170 and up-converted to the appropriated RF frequency by the RF up-converter 180.

Figure 2:
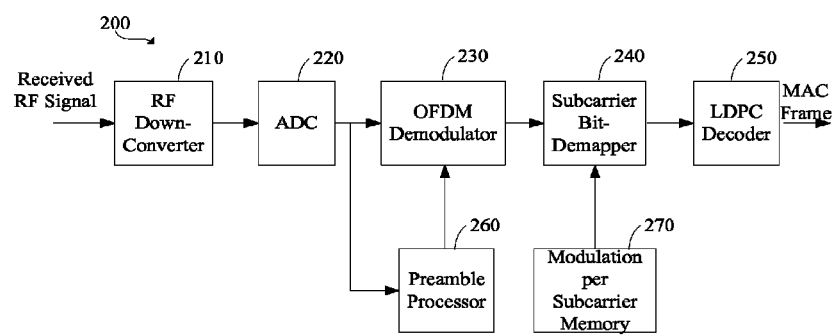
FIG. 2 is a block diagram illustrating a receiver according to an embodiment of the invention.

FIG. 2 is a block diagram illustrating a receiver 200 according to an embodiment of the invention. The receiver 200 comprises an RF down-converter 210 coupled to an analog to digital converter (ADC) 220, which outputs to an OFDM demodulator 230 and a preamble processor 260, which also outputs to the demodulator 230. In an embodiment, the ADC 220 comprises two ADCs, one for I and one for Q streams. The demodulator 230 outputs to a subcarrier bit-demapper 240, which receives an input from a modulation per subcarrier memory 270. The demapper 240 outputs to an LDPC decoder 250.

During operation of the receiver 200, the down-converter 210 filters and down-converts a received RF signal to baseband. The signal is converted to digital samples via two ADCs 220 for the I and Q paths. First the preamble processor 260 uses the preamble to adjust the signal level, detect the received signal, estimate and correct any carrier frequency offset that the received signal may have, and estimate the channel based at the subcarrier estimation (CE) portion of the preamble. The OFDM demodulator 230 converts the received samples to frequency domain via a Fast Fourier Transform (FFT). The complex samples of each subcarrier are equalized using the equalizer coefficients obtained from the channel estimation based on the CE. Then, the equalized complex samples are converted to up to 10 values of Log-Likelihood Ratio (LLR) according to the modulation profile per subcarrier obtained from the modulation per subcarrier memory 270. The LLR values are the soft values needed for LDCP decoding. The LDPC decoder corrects 250 any error that the received PHY frame may have and sends the decoded frame to the MAC block.

The modulation used on each subcarrier (i.e., the value of b, as described further below) is specified in the modulation profile in the memory 270, also sometimes called the bit-loading table. This table is set during profiling for each pair of transmitting and receiving nodes.

The modulation profile contains 480 values of b, one for each subcarrier: $b_i$ is the value at subcarrier i, where it represents the size of the modulation in bits, running from 1 for Binary Phase Sift Keying (BPSK), 2 for Quadrature Phase Shift Keying (QPSK), 3 for 8-(Quadrature Amplitude Modulation) QAM, through 10 for 1024-QAM. For any subcarriers for which $b_i$=0, no demapping is needed because no data were loaded onto the subcarrier. There are 32 subcarriers that always contain zeros. These are called unavailable subcarriers. Any additional nulls in the modulation profile are called unused subcarriers.

Conventionally, modulation profiles need a large memory to store the modulations per subcarrier. The modulation is determined by 4 bits representing one modulation out of 10 possible modulations, from BPSK to 1024-QAM and a modulation of zero is set for subcarriers that are not used. In MoCA 2.0 there are 480 possible active subcarriers, which require a memory size of 1920 (480*4 bits) bits per modulation profile. Since the MoCA 2.0 receiver needs to support up to 15 nodes, the total memory size for storing the modulations of the NPER and VLPER unicast profiles is 57600 (1920*15*2) bits. Reference will be made in detail below to show how to reduce the size of the memory of the modulations per subcarrier by 37.5% (⅜).

Figure 3:
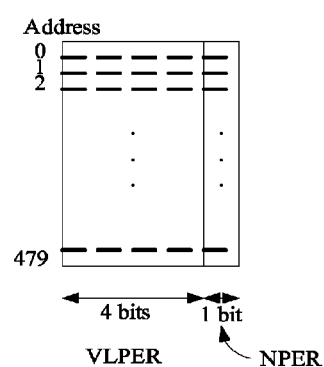
FIG. 3 is a block diagram illustrating a modulation per subcarrier memory for NPER and VLPER.

FIG. 3 is a block diagram illustrating a modulation per subcarrier memory for NPER and VLPER. Since the performance of NPER and VLPER profiles is similar, it's expected that the modulations of the corresponding subcarriers is the same or different by one bit per subcarrier. Therefore, after the receiver 200 sets the modulation profile of the VLPER profiles, it can set the modulations of the corresponding NPER profiles to have the same modulation per subcarrier as the VLPER profile or to be higher by 1 bit per subcarrier. A modulation higher by 1 bit means that the number of bits per modulation is greater by 1. For example, the higher modulation by 1 bit relative to 16-QAM is 32-QAM, where 16-QAM is characterized by 4 bits and 32-QAM is characterized by 5 bits. If the VLPER profile has the modulation of 1024-QAM, the corresponding modulation of the NPER profile will be also 1024-QAM.

The conventional implementation of the modulation per subcarrier memory requires 480×4 bits for each of the following profiles: NPER unicast profile, VLPER unicast profile, NPER GCD profile and VLPER GCD profile. In order to reduce the memory size, the modulation of each subcarrier of both pair of NPER and VLPER profiles can be represented by 5 bits only, where 4 bits represent the modulation of each subcarrier of the VLPER profile and an additional one bit is used to represent whether there is a change in the corresponding modulation of the NPER profile. A bit value of 0 means that the subcarrier of the NPER profile uses the same modulation as the corresponding subcarrier of the VLPER profile, and 1 means a higher modulation by 1. The memory size of the pair of NPER and VLPER profiles is 480×5 bits, where it uses 5 bits per subcarrier instead of 8 bits per subcarrier. Thus, the saving is ⅜=37.5%.

Figure 4:
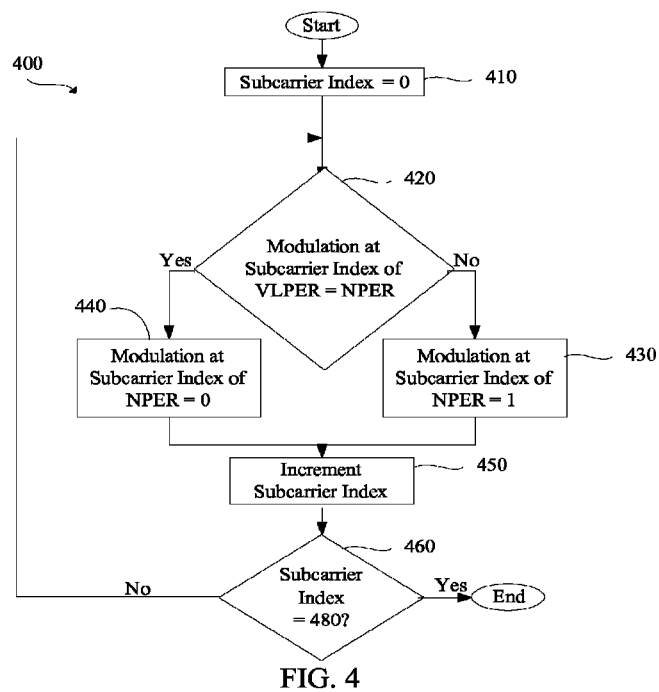
FIG. 4 is a flowchart illustrating a method of reducing representation of NPER modulation per subcarrier.

FIG. 4 is a flowchart illustrating a method 400 of reducing representation of NPER modulation per subcarrier. In an embodiment, the method 400 is performed at a receiver 200 in FIG. 2. Specifically, the method 400 may be performed by a controller (e.g., a CPU) at the receiver 200.

In profiling, modulations on each subcarrier for both VLPER and NPER profiles are determined. As described above, in a conventional method, a modulation is determined by 4 bits representing one modulation out of 10 possible modulations. In this embodiment, a first indicator of 4 bits is used to represent a modulation at a subcarrier for a VLPER profile, and 1 additional bit, which is an embodiment of a second indicator, is used to represent a modulation on the same subcarrier for a NPER profile. Therefore, 5 bits are enough for representing the modulations at one subcarrier for both the VLPER profile and the NPER profile.

In an alternative embodiment, the first indicator of 4 bits are used to represent a modulation at the subcarrier for the NPER profile, and the second indicator of 1 bit is used to represent a modulation at the subcarrier for the VLPER profile.

In an embodiment, the first indicator is stored at the memory 270 before the method 400 starts.

After the receiver 200 finishes with profiling and establishes the modulation per subcarrier for NPER and VLPER profiles, the method 400 goes through all subcarriers to determine the second indicator of 1 bit for the modulation at each subcarrier for the NPER profile.

Specifically, at block 410, the method 400 starts with a subcarrier 0. The method 400 then continues to block 420.

At block 420, the method 400 checks for subcarrier 0 whether the modulation for the NPER profile is the same as the modulation for the VLPER profile. If so, at block 440, a bit of 0 is written in the memory 270 to represent a modulation at subcarrier 0 for the NPER profile. If the modulations at subcarrier 0 are different, a bit of 1 is written in the memory 270 for the NPER profile at subcarrier 0 at block 430, and the modulation for NPER profile at subcarrier 0 is set to be higher by 1 bit relative to the VLPER profile. That is, if the modulation for VLPER profile is 8-QAM at subcarrier 0, it will be 16-QAM for NPER profile. In an alternative embodiment, the modulation for the NPER profile may be even higher relative to the VLPER profile, which is also within the scope of the invention.

Then at block 450, the subcarrier index is incremented and it is determined if the subcarrier index is 480 (corresponding to a $481^{st}$ subcarrier). If so, which means the method 400 has been performed for all subcarriers, the method 400 ends. Otherwise the method 400 returns to block 420 and is performed for the next subcarrier.

In this embodiment, a first node is going to send signals to a second node, the receiver 200 at the second node performs the method 400 and notifies the first and second indicators generated for each subcarrier to the first node. The received information is then stored in a memory 140 in a transmitter 100 at the first node.

Figure 5:
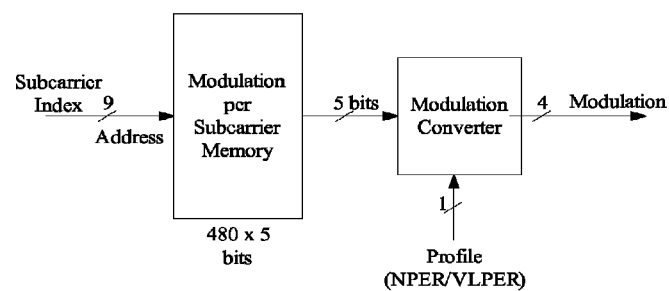
FIG. 5 is a block diagram illustrating a modulation per subcarrier memory providing a signal modulation (modulation) to a subcarrier bit-mapper or a subcarrier bit-demapper as a function of a profile.

FIG. 5 is a block diagram illustrating a modulation per subcarrier memory providing modulations to a subcarrier bit-mapper or a subcarrier bit-demapper as a function of the profile.

When modulating or demodulating, modulations determined and stored may need to be retrieved and provided to a subcarrier bit-mapper or a subcarrier bit-mapper. Without loss of generality, the transmitter 100 in FIG. 1 is described below in detail.

At the transmitter 100 in FIG. 1, a modulation converter (e.g., a controller embedded in the modulation per subcarrier memory 140) is configured to access the memory 140 and provide modulations to the subcarrier bit-mapper.

The modulations per subcarrier are scanned for all the 480 subcarriers. Take subcarrier 0 as an example, if the profile is VLPER, the 4 most significant bits (MSBs) obtained from the modulation per subcarrier memory 270 are output without a change. However, if the profile is NPER, the output modulation per subcarrier further depends on a second indicator (less significant bit, LSB) from the memory 270 stored in associated with the 4 MSBs. In an embodiment, if the second indicator is 0, which means at subcarrier 0, the modulation for the NPER profile is the same as the modulation for the VLPER profile. If the second indicator is 1, the 4 MSBs are summed with 1 or other appropriate value to obtain the modulation at subcarrier 0 for the NPER profile.

Figure 6:
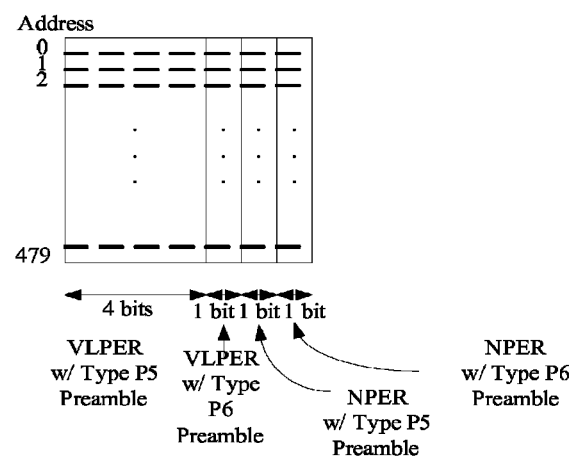
FIG. 6 is a block diagram illustrating a modulation per subcarrier memory for NPER and VLPER unicast profiles using type P5 and P6 preambles.

FIG. 6 is a block diagram illustrating a modulation per subcarrier memory for NPER and VLPER unicast profiles using type P5 and P6 preambles. This embodiment has four unicast high-speed profiles:

1. VLPER Unicast high-speed Profile that uses Type P5 Preamble
2. VLPER Unicast high-speed Profile that uses Type P6 Preamble
3. NPER Unicast high-speed Profile that uses Type P5 Preamble
4. NPER Unicast high-speed Profile that uses Type P6 Preamble There are two unicast high-speed profiles for VLPER, where one uses Type P5 preamble and the other one uses Type P6 preamble. Similarly, there are additional two unicast high-speed profiles for NPER, where one uses Type P5 preamble and the other one uses Type P6 preamble. The modulations per subcarrier of the VLPER profile that uses Type P6 preamble is the same or higher by one relative to the corresponding subcarriers of the VLPER unicast profile that uses Type P5 preamble. Each modulation per subcarrier of the VLPER unicast profile that uses Type P5 preamble is represented by 4 bits. Thus, the representation of the modulation per subcarrier of the VLPER unicast profile that uses Type P6 preamble can use just 1 bit. When the modulation per subcarrier is the same, the one bit that represents the modulation of the VLPER unicast profile that uses Type P6 preamble is set to 0, but when the modulation is higher by 1, it's represented by 1.

Similarly, the modulations per subcarrier of the NPER profile that uses Type P5 preamble are the same or higher by 1 relative to the VLPER profile that uses Type P5 preamble. Therefore, one bit per subcarrier can be used to represent the modulations per subcarrier of the NPER profile that uses Type P5 preamble. A bit of 0 means that the modulation per subcarrier of the NPER profile that uses Type P5 preamble is the same as the modulation per subcarrier of the VLPER profile that uses Type P5 preamble for the corresponding subcarrier, and bit of 1 means that modulation of the NPER profile that uses Type P5 preamble is higher by one relative to the modulation of the VLPER profile that uses Type P5 preamble for the corresponding subcarrier.

Similarly, the modulations per subcarrier of the NPER profile that uses Type P6 preamble are the same or higher by 1 relative to the NPER profile that uses Type P5 preamble. Therefore, one bit per subcarrier can be used to represent the modulations per subcarrier of the NPER profile that uses Type P6 preamble. A bit of 0 means that the modulation of the NPER profile that uses Type P6 preamble is the same as the modulation of the NPER profile that uses Type P5 preamble for the corresponding subcarrier, and bit of 1 means that modulation per subcarrier of the NPER profile that uses Type P6 preamble is higher by 1 relative to the modulation of the NPER profile that uses Type P5 preamble for the corresponding subcarrier.

The brute-force implementation of the modulation per subcarrier memory comprises 4 memory modules, where the size of each one is 480×4 bits.

The memory size can be reduced from 4×480×4 bits to 480×7 bits by using 1 bit to represent the modulation per subcarrier for 3 unicast profiles out of the 4 unicast profiles. Therefore, the memory size that stores the modulations per subcarrier of the four unicast high-speed profiles can be reduced by 56.25% similarly to the memory size reduction of the NPER and VLPER profiles as described above.

Figure 7:
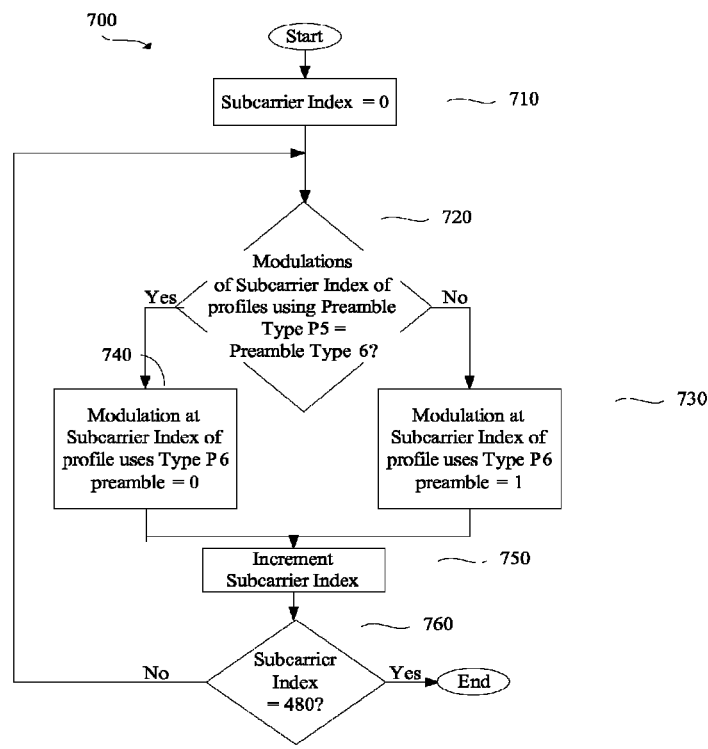
FIG. 7 is a flowchart illustrating a method of reducing the representation of modulations of profile that uses Type 6 preamble.

FIG. 7 is a flowchart illustrating a method 700 of reducing the representation of modulations of profile that uses Type 6 preamble.

Similarly to method 400, the method 700 may be performed by a CPU at the receiver 200. After the receiver 200 finishes with profiling and establishes the modulation per subcarrier for NPER profiles that use Type P5 and Type P6 preambles and VLPER profiles that use Type P5 and Type P6 preambles, the controller starts the method 700.

In an embodiment, before method 700, the modulation per subcarrier of VLPER profile with a Type P5 preamble is stored in the memory illustrated in FIG. 6, each represented by 4 bits.

The method 700 starts with subcarrier 0 at block 710.

At block 720, the method 700 checks for subcarrier 0 whether the modulation for VLPER profile with a Type P6 preamble is the same as the VLPER profile with the Type P5 preamble.

If so, the method 700 enters block 740, a bit of 0 is written in the memory for subcarrier 0 for the VLPER profile with the Type P6 preamble.

However, if the modulations at subcarrier 0 are different, at block 730, a bit of 1 is written in association with subcarrier 0 for the VLPER profile with the Type P6 preamble, and the modulation at subcarrier 0 is set to be higher by 1 bit relative to the VLPER profile with the Type P5 preamble.

At block 750, an subcarrier index is incremented and it is determined if the subcarrier index is equal to 480, which means the method 700 has been performed for all subcarriers 0-479. If so, the method 700 ends. Otherwise the method 700 returns to block 720 and is performed for the next subcarrier.

Similarly, for each subcarrier, a modulation for a NPER profile with the Type P5 preamble is compared to the modulation for the VLPER profile with the Type P5 preamble. For each subcarrier, if the modulations are the same, a bit of 0 is written in the memory for that subcarrier for the NPER profile with the Type P5 preamble. Otherwise a bit of 1 is written in the memory instead, and the modulation at that subcarrier for the NPER profile with the Type P5 preamble is set to be higher by 1 bit relative to the modulation at that subcarrier for the VLPER profile with the Type P5 preamble.

In addition, for each subcarrier, a modulation for a NPER profile with the Type P6 preamble is compared to the modulation for the NPER profile with the Type P5 preamble. For each subcarrier, if the modulations are the same, a bit of 0 is written in the memory for that subcarrier for the NPER profile with the Type P6 preamble. Otherwise a bit of 1 is written in the memory instead, and the modulation at that subcarrier for the NPER profile with the Type P6 preamble is set to be higher by 1 bit relative to the modulation at that subcarrier for the NPER profile with the Type P5 preamble. In an alternative embodiment, the modulation at that subcarrier for the NPER profile with the Type P6 preamble may be compared to the modulation at that subcarrier for the VLPER profile with the Type P6 preamble.

Therefore, examining the memory in FIG. 6, for each subcarrier, a second indicator comprises 3 bits, with the first representing a relationship between a VLPER profile with the Type P5 preamble and a VLPER profile with the Type P6 preamble, the second representing a relationship between the VLPER profile with the Type P5 preamble and a NPER profile with the Type P5 preamble and the third representing a relationship between a NPER profile with the Type P6 preamble and the NPER profile with the Type P5 preamble (or the VLPER profile with the Type P6 preamble). In an alternative embodiment of the invention, the bits in the second indicator may be different from the one illustrated in FIG. 6.

Figure 8:
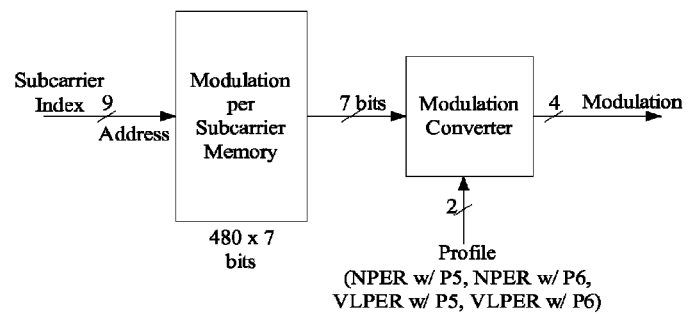
FIG. 8 is a block diagram illustrating a modulation per subcarrier memory providing a modulation to a subcarrier bit-mapper or a subcarrier bit-demapper as a function of a profile.

FIG. 8 is a block diagram illustrating a modulation per subcarrier memory providing modulations to a subcarrier bit-mapper or a subcarrier bit-demapper as a function of the profile subcarrier bit-mapper and subcarrier bit-demapper obtaining modulations per subcarrier memory as a function of the profile. Reference will be made below referring to FIGS. 6 and 8.

Similarly to the embodiment in FIG. 6, the modulation converter in FIG. 8 may be a controller embedded in the modulation per subcarrier memory (e.g., the memory 270 in FIG. 2).

As shown in FIG. 8, an modulation output by the modulation converter is based on the profile. If the profile is a VLPER profile with a Type P5 preamble, the 4 MSBs obtained from the modulation per subcarrier memory are output without a change. However, if the profile is a VLPER with Type P6 preamble, the output modulation depends on bit number 5 from the left side of the memory, i.e., the first one in the second indicator. If the bit is 0, the 4 MSB are output without a change, and the modulation for the VLPER profile with the Type P6 preamble is the same as the modulation for VLPER profile with the Type P5 preamble at the same subcarrier. If the bit is 1, the 4 MSBs are summed with 1 to obtain the modulation at that subcarrier for the VLPER profile with the Type P6 preamble.

Similarly, if the profile is a NPER profile with a Type P5 preamble, the modulation output by the modulation converter depends on bit number 6 from the left side of the memory (i.e., the second bit in the second indicator). If the bit is 0, the 4 MSB are output without a change, and the modulation of the corresponding subcarrier of the NPER profile with the Type P5 preamble is the same as the modulation of the VLPER profile with the Type P5 preamble at that subcarrier. If the bit is 1, the 4 MSBs are summed with 1 to obtain the modulation at that subcarrier for the NPER profile with the Type P5 preamble.

Similarly, if the profile is a NPER profile with a Type P6 preamble, the modulation per subcarrier depends on bit number 7 from the left side of the memory (i.e., the third bit in the second indicator). If the bit is 0, the modulation for the NPER profile with the Type P6 preamble is the same as the modulation for the NPER profile with the Type P5 preamble at that subcarrier. If the bit is 1, the modulation for the NPER profile with the Type P6 preamble at that subcarrier equals to the modulation for the NPER profile with the Type P5 preamble plus 1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
   receiving a profile;
   determining a first modulation according to a first indicator of a plurality of indicators stored in a memory;
   determining a signal modulation as the first modulation when the profile is a first profile; and
   determining the signal modulation in relation to the first modulation according to a second indicator of the plurality of indicators when the profile is a second profile,
   wherein the first indicator includes a plurality of bits, and the second indicator is a single bit.

2. The method of claim 1, further comprising determining the signal modulation in relation to the first modulation according to a third indicator of the plurality of indicators when the profile is a third profile.

3. The method of claim 1, further comprising determining the signal modulation in relation to the first modulation according to the second indicator and a third indicator of the plurality of indicators when the profile is a third profile.

4. The method of claim 1, wherein the method is performed for each of a plurality of subcarriers.

5. The method of claim 1, wherein the second indicator having a first value indicates that the first modulation is the same as the second modulation, and the second indicator having a second value indicates that the first modulation has a higher bit rate than the second modulation.

6. The method of claim 1, wherein the second indicator having a first value indicates that the first modulation is the same as the second modulation, and the second indicator having a second value indicates that the first modulation has a lower bit rate than the second modulation.

7. The method of claim 1, further comprising:
   receiving the plurality of indicators from a first device; and
   storing the plurality of indicators in the memory, wherein a second device includes the memory.

8. The method of claim 1, wherein the first and second modulations are each selected from one of no modulation, Binary Phase Shift Keying, Quadrature Phase Shift Keying, 8-Quadrature Amplitude Modulation (QAM), 16-QAM, 32-QAM, 64-QAM, 128-QAM, 256-QAM, 512-QAM, and 1024-QAM.

9. A non-transitory computer-readable medium configured to store instructions which enable a controller to perform a machine implemented method, the method comprising:
   determining a first modulation;
   determining a second modulation;
   generating a first indicator according to the first modulation; and
   generating a second indicator indicating a relationship between the first modulation and the second signal modulation,
   wherein the method is performed for each of a plurality of subcarriers.

10. The non-transitory computer-readable medium of claim 9, wherein the method further comprises:
    generating the second indicator having a first value when the first modulation is the same as the second modulation; and
    generating the second indicator having a second value when the first modulation has a higher bit rate than the second modulation.

11. The non-transitory computer-readable medium of claim 9, wherein the method further comprises:
    generating the second indicator having a first value when the first modulation is the same as the second modulation; and
    generating the second indicator having a second value when the first modulation has a lower bit rate than the second modulation.

12. The non-transitory computer-readable medium of claim 9, wherein the method further comprises communicating the first and second indicators to a device other than the controller.

13. The non-transitory computer-readable medium of claim 9, wherein the first and second modulations are each selected from one of no modulation, Binary Phase Shift Keying, Quadrature Phase Shift Keying, 8-Quadrature Amplitude Modulation (QAM), 16-QAM, 32-QAM, 64-QAM, 128-QAM, 256-QAM, 512-QAM, and 1024-QAM.

14. A circuit comprising:
    a memory configured to store a plurality of indicators for a subcarrier, wherein a first indicator of the plurality of indicators indicates a first modulation; and
    a converter configured to output a modulation for the subcarrier according to the plurality of indicators and a profile, wherein
    when the profile is a first profile, the converter is configured to output the first modulation,
    when the profile is a second profile, the converter is configured to output a second modulation according to the first modulation and a second indicator of the plurality of indicators, and
    when the profile is a third profile, the converter is configured to output a third modulation according to the first modulation and a third indicator of the plurality of indicators.

15. The circuit of claim 14, wherein when the profile is a third profile, the converter is configured to output a third modulation according to the first modulation, the second indicator, and a third indicator of the plurality of indicators.

16. The circuit of claim 14, wherein the plurality of indicators is a selected plurality of indicators and the subcarrier is a selected subcarrier, and further comprising:
    the memory configured to store a plurality of indicators for each of a plurality of subcarriers, receive a subcarrier index, and output the selected plurality of indicators when the received subcarrier index indicates the selected subcarrier.

17. The circuit of claim 14, wherein the first indicator includes a plurality of bits, and the second indicator is a single bit.

* * * * *